(12) United States Patent
Zum Mallen

(10) Patent No.: US 6,358,372 B1
(45) Date of Patent: Mar. 19, 2002

(54) METHOD OF REDUCING FORMATION OF PRECIPITATES IN SOLVENT RECOVERY SYSTEM

(75) Inventor: Michael Philip Zum Mallen, Sugar Land, TX (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/613,954

(22) Filed: Jul. 11, 2000

(51) Int. Cl.[7] .................................................. B01D 3/34
(52) U.S. Cl. ................... 203/6; 203/7; 203/63; 585/833; 585/867
(58) Field of Search ................ 203/63–65, 68–70, 203/6, 7, 1; 526/123, 124; 502/133, 132; 585/817, 833, 837, 867

(56) References Cited

U.S. PATENT DOCUMENTS

| | | |
|---|---|---|
| 4,330,649 A | 5/1982 | Kioka et al. |
| 4,472,521 A | 9/1984 | Band |
| 4,540,679 A | 9/1985 | Arzoumanidis et al. |
| 4,728,705 A | 3/1988 | Nesterode et al. |
| 5,034,361 A | 7/1991 | Job et al. |
| 5,066,737 A | 11/1991 | Job |
| 5,077,357 A | 12/1991 | Job |
| 5,082,907 A | 1/1992 | Job |
| 5,106,806 A | 4/1992 | Job |
| 5,146,028 A | 9/1992 | Job |
| 5,151,399 A | 9/1992 | Job |
| 5,229,342 A | 7/1993 | Job |
| 5,242,549 A | 9/1993 | Potter et al. |
| 5,371,157 A | * 12/1994 | Vob ............................. 526/124 |
| 5,948,212 A | 9/1999 | Kitty et al. |

* cited by examiner

*Primary Examiner*—Virginia Manoharan

(57) ABSTRACT

A method of removing at least one inert reaction diluent and/or wash solvent from a waste stream from a catalyst precursor production unit is disclosed, where the waste stream includes at least one reaction diluent or wash solvent, at least one titanium alkoxide, at least one magnesium alkoxide, and at least one alkanol. At least one inert reaction diluent and/or wash solvent is removed by contacting the waste stream with a solubilization solvent, and then subjecting the resulting stream to distillation. The solubilization solvent: (i) is present in an amount sufficient to maintain solubility of residual titanium and magnesium alkoxide species; (ii) has a boiling point higher than that of the one or more reaction diluent and/or wash solvent; and optionally but preferably (iii) does not form an azeotrope with the one or more reaction diluent and/or wash solvent. The method prevents precipitation of solid titanium and magnesium containing species during distillation, and provides efficient and effective recovery of the reaction diluent(s) and wash solvent(s).

3 Claims, 1 Drawing Sheet

14
METHOD OF REDUCING FORMATION OF PRECIPITATES IN SOLVENT RECOVERY SYSTEM

BACKGROUND OF THE INVENTION

1. Field of the Invention

The present invention relates to a method of reducing precipitate formation in a solvent recovery system. The method enables more efficient recovery of the solvent (also referred to as a diluent) reduces formation of solid material in distillation column reboilers and related equipment in the solvent recovery system, and reduces the waste effluent from the system.

2. Description of Related Art

Various types of catalysts useful for polymerizing α-olefins are known. Most of the current catalysts are based on Ziegler-Natta technology, and many of the recent titanium-based olefin polymerization catalysts are stereoregulating, and they have sufficient activity to avoid extraction and deashing. These high activity catalysts typically are prepared from a solid procatalyst that usually contains magnesium, titanium and halide moieties, a cocatalyst (usually an organoaluminum compound) and, when propylene is polymerized in particular, a selectivity control agent (SCA). The solid titanium-containing compound typically is referred to as a "procatalyst," the organoaluminum compound, whether complexed or not, usually is referred to as the "cocatalyst" and the third component external electron donor, whether used separately or partially or totally complexed with the organoaluminum compound, is referred to as the "selectivity control agent." Throughout this disclosure, these terms will be used in accordance with the aforementioned designations.

Many chemical combinations of procatalysts, cocatalysts and selectivity control agents are known in the art to produce active catalysts. Through considerable experience, however, certain materials are of greater interest than others. For example, there is significant research in the area of procatalysts, which typically is some chemical combination of magnesium, titanium tetrachloride and an internal electron donor. These internal electron donors usually are aromatic esters such as ethyl benzoate or ethyl p-toluate. Conventional cocatalysts include an aluminum trialkyl such as triethylaluminum or triisobutylaluminum that is often complexed with a portion of the selectivity control agent (or external electron donor), which also is typically an aromatic ester. Although variations in any of these catalyst components will influence the performance of the resultant catalyst, the component that appears to offer the greatest opportunity for modification to produce greater catalyst activity is the procatalyst.

The literature is rife with disclosures relating to the various known methods of preparing procatalysts. For example, Kioka, et al., U.S. Pat. No. 4,330,649, the disclosure of which is incorporated by reference herein in its entirety, describes a solid catalyst component (procatalyst) that is prepared by heating a soluble magnesium compound such as magnesium chloride with a higher alcohol in the presence of an ester to produce a solution. This solution contains a "precursor" of the procatalyst, which then is added to titanium tetrachloride and an electron donor (internal) to form the procatalyst. Brand, U.S. Pat. No. 4,472,521, the disclosure of which is incorporated by reference herein in its entirety, reacts a magnesium alkoxide, wherein each alkoxide has four or more carbons, in the presence of an aromatic hydrocarbon. Titanium tetrachloride and an internal electron donor then are added to the resulting solution to form a solid procatalyst. Arzoumanidis, U.S. Pat. No. 4,540,679, the disclosure of which is incorporated by reference herein in its entirety, produces an olefin polymerization catalyst component by contacting a suspension of magnesium ethoxide in ethanol with carbon dioxide. The addition of organoaluminum in hydrocarbon results in the formation of granular particles that are employed as a support for a titanium compound upon contact with titanium tetrachloride. Nestlerode, et al., U.S. Pat. No. 4,728,705, the disclosure of which is incorporated by reference herein in its entirety, solubilizes magnesium ethoxide in ethanol with carbon dioxide and spray dries the resulting solution or uses the solution to impregnate carrier particles. The solid particles resulting from either modification are useful in the production of a procatalyst of desirable morphology.

A number of United States patents issued to Robert C. Job (and Robert C. Job, et al.,) describe various mechanisms for preparing magnesium-containing, titanium-containing compounds that are useful as precursors for the production of procatalysts that are ultimately useful in preparing catalysts for the polymerization of α-olefins. For example, U.S. Pat. Nos. 5,034,361; 5,082,907; 5,151,399; 5,229,342; 5,106,806; 5,146,028; 5,066,737; and 5,077,357, the disclosures of which are incorporated by reference herein in their entirety, disclose various procatalyst precursors. U.S. Pat. No. 5,034,361 discloses solubilizing a magnesium alkoxide in an alkanol solvent by interaction of the magnesium alkoxide compound and certain acidic materials. This magnesium alkoxide then can be used either directly as a magnesium-containing catalyst precursor, or can be reacted with various titanium compounds to produce a magnesium and titanium-containing catalyst precursor.

U.S. Pat. Nos. 5,082,907; 5,151,399; 5,229,342; 5,106,806; 5,146,028; 5,066,737; and 5,077,357 disclose various magnesium and titanium-containing catalyst precursors, some of which are prepared by using the aforementioned magnesium alkoxide as a starting material. These precursors are not active polymerization catalysts, and they do not contain any effective amounts of electron donor. Rather, the precursors are used as starting materials in a subsequent conversion to an active procatalyst. Magnesium and titanium-containing procatalysts are formed by reacting the magnesium and titanium-containing precursor with a tetravalent titanium halide, an optional hydrocarbon and an electron donor. The resulting procatalyst solid then is separated from the reaction slurry (by filtration, precipitation, crystallization, and the like). These procatalysts are then converted to polymerization catalysts by reaction with, for example, an organoaluminum compound and a selectivity control agent.

Production of these precursors typically involves precipitating a solid magnesium and titanium containing component from solution or suspension and then filtering the suspension containing the precipitated precursor. The solid component can be precipitated by driving off excess alkanol from the solution or suspension, and then the remaining suspension filtered to recover the solid precursor component. The filtrate from the filtration typically contains a number of useful ingredients that can be recovered by various recovery mechanisms. In addition, this composition may include environmentally hazardous ingredients, such as chlorinated hydrocarbons, and the like, Moreover, the reaction diluent used in making the precursor, (e.g., sometimes a chlorinated hydrocarbon), is a valuable ingredient that can be recovered and recycled to the manufacturing unit.

It is known in the art to recover valuable by-products of procatalyst manufacture by subjecting the waste stream to one or more distillations, in the presence or absence of additional solvents, to recover the valuable titanium. U.S. Pat. Nos. 5,242,549 and 5,948,212, the disclosures of which are incorporated by reference in their entirety, both disclose processes of recovering titanium from the waste stream from a procatalyst manufacturing process. These patents are not concerned with recovering an inert reaction diluent from the waste stream of a precursor production unit, nor do they address the problem of preventing the formation of precipitates in a separation unit used to recover valuable by-products from the waste stream of a precursor production unit.

It would be useful to recover the valuable by-products, and to remove environmental hazardous by-products from the waste stream. A known recovery mechanism is to convey the waste stream to a distillation unit whereby the useful and/or hazardous ingredients are removed as light components. Distilling this waste stream, however, can cause precipitation of solid components (e.g., magnesium and titanium containing species), because any remaining alkanol that had dissolved these species is driven off in the subsequent distillation. Precipitation of these species causes undesirable solids accumulation in distillation column reboilers, and other related equipment.

SUMMARY OF THE INVENTION

Thus, there exists a need to provide an efficient and effective method of recovering useful ingredients that typically are present in the waste stream from a catalyst precursor manufacturing unit. There also exists a need to provide an efficient and effective method of removing environmentally hazardous ingredients that can be present in the waste stream from a catalyst precursor manufacturing unit. In addition, there exists a need to develop a method of making a catalyst precursor more economically by enabling reuse of valuable by-products or waste effluent, and efficient disposal of waste. There also exists a need to develop a process that prevents precipitation of solid components during distillation of a waste stream from a catalyst precursor production unit, while at the same time enabling efficient recovery of valuable components in the waste stream. It is therefore a feature of an embodiment of the present invention to provide a method of making a catalyst precursor, and a method of recovering and/or removing ingredients from a waste stream from a catalyst precursor production unit, that satisfies these needs, as well as other needs readily apparent to those skilled in the art.

In accordance with these and other features of an embodiment of the present invention, there is provided a method of removing at least one inert reaction diluent and/or wash solvent from a waste stream from a catalyst precursor production unit, the waste stream including at least one reaction diluent and/or wash solvent, at least one titanium alkoxide, at least one magnesium alkoxide, and at least one alkanol. The one or more inert reaction diluent and/or wash solvent can be removed by contacting the waste stream with a solubilization solvent, and then subjecting the resulting stream to distillation. The solubilization solvent: (i) is present in an amount sufficient to maintain the solubility of residual titanium and magnesium alkoxide species; (ii) has a boiling point higher than that of the reaction diluent(s) and/or wash solvent(s); and optionally, but preferably (iii) does not form an azeotrope with the reaction diluent(s) and/or wash solvent(s).

In accordance with an additional feature of an embodiment of the present invention, there is provided a method of making a catalyst precursor that includes contacting at least one titanium alkoxide, at least one magnesium alkoxide, at least one alkanol, and at least one reaction diluent, and removing a portion of the alkanol to precipitate a solid titanium and magnesium containing precursor component, thereby resulting in a suspension of the precursor in the at least one reaction diluent. The solid titanium and magnesium containing precursor component then is separated from the suspension to form a solid precursor component and a waste stream that preferably includes the at least one reaction diluent, at least one titanium alkoxide, at least one magnesium alkoxide, and at least one alkanol. Optionally, the solid precursor component is then subjected to a wash solvent, and then again separated from the suspension to form a solid precursor component and a second or combined waste stream that preferably includes at least one reaction diluent and/or wash solvent, at least one titanium alkoxide, at least one magnesium alkoxide, and at least one alkanol. The one or more inert reaction diluent and/or wash solvent can then be recovered by contacting the waste stream with a solubilization solvent, and then subjecting the resulting stream to distillation. The solubilization solvent: (i) is present in an amount sufficient to maintain the solubility of residual titanium and magnesium alkoxide species; (ii) has a boiling point higher than that of the reaction diluent(s) and/or wash solvent(s); and optionally, but preferably (iii) does not form an azeotrope with the reaction diluent(s) and/or wash solvent (s).

In accordance with yet another feature of an embodiment of the present invention, there is provided a method of making a polymerization catalyst that includes contacting the solid precursor component prepared as above with: (i) an electron donor; (ii) a halide of tetravalent titanium; and (iii) optionally, a hydrocarbon or halohydrocarbon.

DETAILED DESCRIPTION OF PREFERRED EMBODIMENTS

Figure 1:
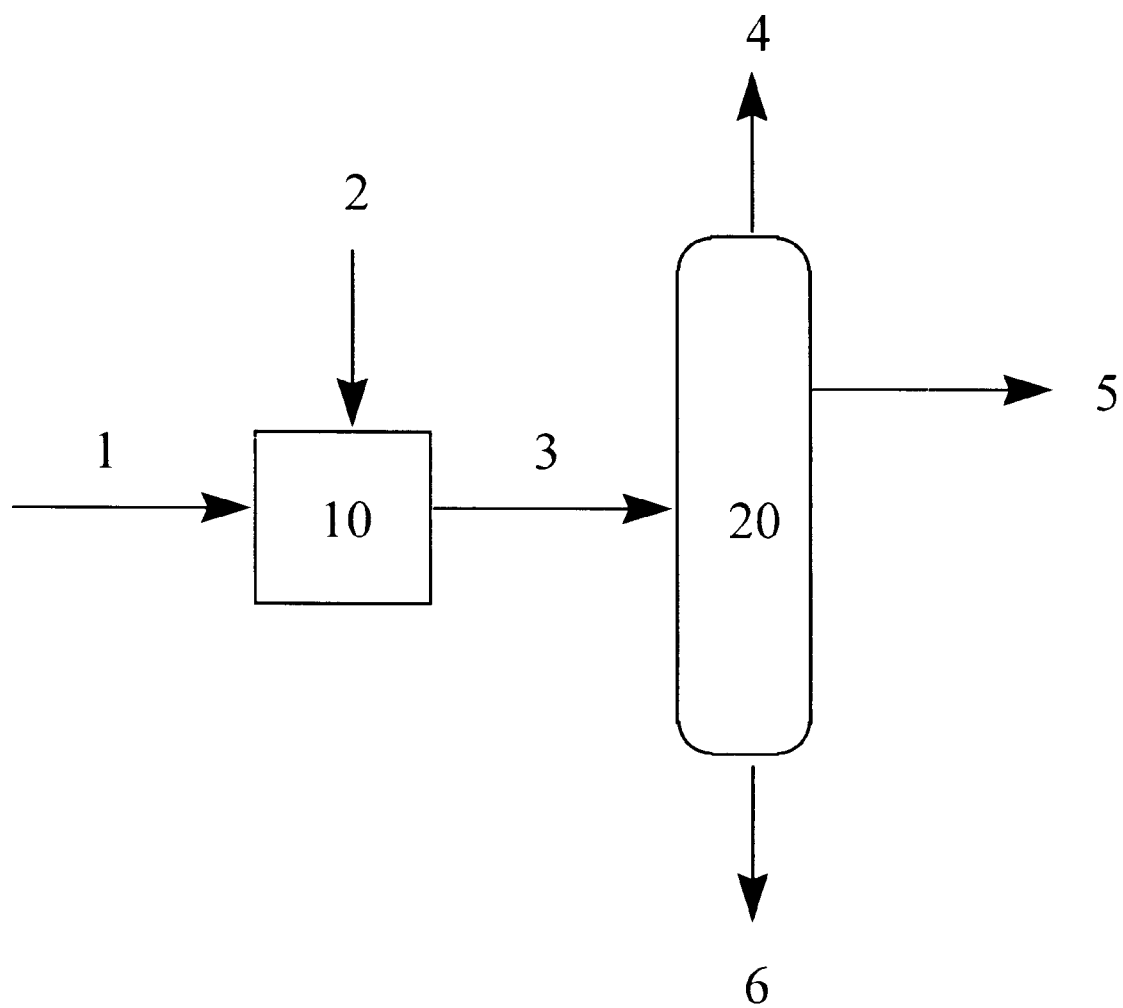
FIG. 1 illustrates a preferred separation unit useful in the present invention.

Throughout this description the term "precursor" and the expression "procatalyst precursor" denotes a material that is not an active catalyst, does not contain an electron donor, and that can be converted to a "procatalyst" (defined below) by contacting it with a metal halide (preferably $TiCl_4$) and an electron donor. Throughout this description, the term "procatalyst" denotes a solid material that is an active catalyst component, and that can be converted to a polymerization catalyst by contact with an organoaluminum compound (preferably triethyl aluminum (TEAL)), and an optional external donor, or selectivity control agent.

As mentioned above, the method of the present invention is particularly suitable for removing and recovering inert diluents and/or wash solvents used in the production of polymerization catalyst precursors. The invention is not limited to this particular system, however, and can be used with any liquid mixture, solution, suspension which forms a precipitate when distilled. Specifically, the features of various embodiments of the present invention can be achieved by using a solubilization solvent preferably having the characteristics noted above; namely; a solubilization solvent that: (i) is capable of maintaining the solubility of any potential precipitates that otherwise would form without its addition; (ii) has a boiling point higher than at least one of the light components removed by distillation; and optionally, (iii) does not form an azeotrope with the light component(s) removed.

Preferred embodiments of the present invention are particularly useful in removing an inert diluent and/or wash solvent that remains in the waste stream(s) from a processing unit used to make an olefin polymerization procatalyst precursor that is comprised of magnesium, titanium and optionally at least one compound selected from the group consisting of alkoxide, trialkylborate and optionally substituted phenoxide. The precursor can be made by any suitable method that results in a waste stream or streams containing at least one inert diluent and/or wash solvent, and that preferably includes at least one titanium alkoxide, at least one magnesium alkoxide, and at least one alkanol. Various methods of making magnesium and titanium-containing high activity olefin polymerization procatalyst precursors are known in the art. These methods are described, inter alia, in U.S. Pat. Nos.: 5,034,361; 5,082,907; 5,151,399; 5,229, 342; 5,106,806; 5,146,028; 5,066,737; 5,077,357; 4,442, 276; 4,540,679; 4,547,476; 4,460,701; 4,816,433; 4,829, 037; 4,927,797; 4,990,479; 5,066,738; 5,028,671; 5,153, 158; 5,247,031; and 5,247,032, the disclosures of each of these documents being incorporated by reference herein in their entirety. Particularly preferred methods of making the olefin polymerization procatalyst precursor are described below.

In one preferred embodiment, the procatalyst precursor is produced in a two-step synthesis initially involving the reaction of a magnesium alkoxide, i.e., Mg(OR)2, and a titanium tetraalkoxide, i.e., Ti(OR)$_4$, in which the alkoxide moieties independently contain up to 4 carbon atoms, with certain phenolic compounds. The alkoxide moieties of the two metal alkoxide reactants can be the same or different, as are the alkoxide moieties within an individual alkoxide reactant. The group OR can be any alkoxide radical selected from methoxide, ethoxide, n-propoxide and n-butoxide. Preferably, OR is ethoxide.

Various phenolic compounds can be used as an initial reactant. Preferably, the phenolic compound is selected from phenol or activating group-substituted phenol. The expression "activating group" as it is used in this context, denotes a ring carbon atom substituent free from active hydrogen atoms that is ortho-para directing relative to further aromatic ring substitution and which is generally but not invariably electron donating. Specifically preferred activating groups include alkyl of up to 5 carbon atoms, e.g., methyl, ethyl, isopropyl or t-butyl; alkoxy of up to 5 carbon atoms, e.g., methoxy, ethoxy, butoxy, or amyloxy; halo, particularly chloro or bromo; and dialkylamino where each alkyl has up to 5 carbon atoms such as dimethylamino and diethylamino. Particularly preferred phenolic compounds useful as an initial reactant include phenol, p-cresol, o-cresol, 3-methoxyphenol, e-dimethylaminophenol, 2,6-dimethylphenol and 2,6-di-t-butyl-4-methylphenol. The o-cresol phenolic compound is particularly preferred.

The initial reaction typically takes place in an inert reaction diluent by contacting magnesium alkoxide, titanium alkoxide and the phenolic compound at an elevated temperature. Any reaction diluent that is inert towards the reactants and has a relatively high boiling point so as to be a liquid during the contacting stage can be used. Preferred diluents include chlorobenzene, toluene, xylene and isooctane. Chlorobenzene is particularly preferred. The temperature at which the ingredients are reacted typically is within the range of from about 60° C. to about 130° C. at a pressure sufficient to maintain the reaction mixture in a liquid phase.

The initial product is a stoichiometric complex of the starting materials illustrated but not limited by the formula (I):

$$Mg_3Ti(phenolate)_2(OR)_8 \tag{1}$$

wherein R independently is a lower alkyl of up to 4 carbon atoms inclusive, and phenolate is the anion corresponding to the phenolic compound reactant. This product usually is a clear solution in the reaction diluent employed in its production.

The initial complex then is contacted with a magnesium halide alcoholate, preferably a hexaalcoholate, in which the alcohol moieties are of the formula ROH where R independently is a lower alkyl of up to 4 carbon atoms inclusive. The magnesium halide preferably is a magnesium chloride or a magnesium bromide (magnesium chloride is particularly preferred). The initial complex and the magnesium halide alcoholate are mixed in an inert reaction diluent that is the same as the diluent used in the production of the initial complex or is different by virtue of the addition of a co-diluent or by diluent exchange. Preferably, the diluent is the same and the second synthetic procedure comprises the addition of the magnesium halide alcoholate to the product mixture containing the initial complex.

The reactants preferably are contacted and heated at a relatively mild temperature, e.g., up to about 100° C., until a clear solution is obtained and then heated at a higher temperature, from about 110° C. to about 140° C., for example, to remove ethanol from the reaction mixture, typically as an azeotrope with a portion of the reaction diluent. This ethanol removal is accompanied by the formation of opaque, spheroidal particles and typically ethanol is removed until the production of such particles ceases.

The solid precursor materials then can be separated from the reaction mixture by any suitable means, including but not limited to, decantation, filtration, centrifugation, and the like. Preferably, the solid material is filtered, most preferably under the impetus of pressure. The filtered solids then can be washed at least once with one or more solvents, including but not limited to monochlorobenzene, toluene, xylene, isopentane, isooctane, and the like. These wash solvents then can be removed by any means, but preferably are removed by blowing an inert gas through the filter cake. The dried filter cake then can be subjected to drying to produce a dry procatalyst precursor.

Alternatively, the solid precursor materials can be separated from the reaction solution or slurry by any means capable of separating a solid from a liquid. For example, the mixture containing the magnesium and titanium-containing precursor of the present invention can produce the solid, substantially dry high activity olefin polymerization procatalyst precursor by conventional methods such as impregnation, spray drying or spray cooling. Spray drying processes are well known in the art and are described, for example, in Job, U.S. Pat. No. 5,034,361 and Nestlerode, et al., U.S. Pat. No. 4,771,024, the disclosures of which are incorporated by reference herein in their entirety. The solution containing the magnesium and titanium-containing precursor usually is passed through a suitable atomizer to produce a spray or dispersion of droplets of the liquid mixture, a stream of hot gas such as nitrogen is arranged to contact the droplets to evaporate the solvent and the resulting solid product is collected. Atomization of the solution typically takes place in the absence of water or oxygen and nozzle atomizers or spinning disk atomizers are usually employed.

In another preferred embodiment, the procatalyst precursor can be produced by contacting a magnesium alkoxide, a titanium alkoxide, a titanium halide, a phenolic compound and an alkanol. The alkoxide moieties in the magnesium alkoxide and the titanium alkoxide are the same as those described above. Specifically, the alkoxide moieties independently have up to 4 carbon atoms inclusive. The alkoxide moieties within one reactant are the same or different if more than one alkoxide moiety is present, and the alkoxide moieties of one reactant are the same or different from alkoxide moieties in other reactants. Although alkoxide moieties such as methoxide, propoxide, isopropoxide and butoxide are useful, the preferred alkoxide moieties are ethoxide. The halide moieties of the titanium tetrahalide preferably are chloride or bromide with chloride being particularly preferred.

The phenolic compound used in the production of the procatalyst precursor preferably is the same as the phenolic compound described above. Preferably, the phenolic compound is selected from phenol or activating group-substituted phenol. The expression "activating group" as it is used in this context, denotes a ring carbon atom substituent free from active hydrogen atoms that is ortho-para directing relative to further aromatic ring substitution and which is generally but not invariably electron donating. Specifically preferred activating groups include alkyl of up to 5 carbon atoms, e.g., methyl, ethyl, isopropyl or t-butyl; alkoxy of up to 5 carbon atoms, e.g., methoxy, ethoxy, butoxy, or amyloxy; halo, particularly chloro or bromo; and dialkylamino where each alkyl has up to 5 carbon atoms such as dimethylamino and diethylamino. Particularly preferred phenolic compounds useful as an initial reactant include phenol, p-cresol, o-cresol, 3-methoxyphenol, 4-dimethylaminophenol, 2,6-dimethylphenol and 2,6-di-t-butyl-4-methylphenol. The o-cresol phenolic compound is particularly preferred.

The procatalyst precursor can be produced by contacting the reactants in an inert reaction diluent. The diluent preferably is a hydrocarbon diluent such as isopentane, isooctane, cyclohexane, xylene, or toluene, or a halohydrocarbon such as methylene chloride, chlorotoluene, or chlorobenzene. Isooctane is a preferred hydrocarbon diluent and chlorobenzene is a preferred halohydrocarbon diluent. Although the formation of the procatalyst precursor does not appear to observe conventional molar stoichiometry, the production of the precursor is illustrated by the following partial general equation (employing preferred alkoxide and halide moieties):

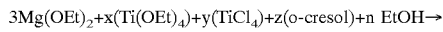

3Mg(OEt)$_2$+x(Ti(OEt)$_4$)+y(TiCl$_4$)+z(o-cresol)+n EtOH→ wherein y is more than about 0.1 but less than about 0.8, preferably more than 0.3 but less than 0.5, (x+y) is more than about 0.2 but less than about 3, preferably more than about 0.5 but less than about 2, z is more than about 0.05 but less than about 3, preferably more than about 0.1 but less than about 2, and n is more than about 0.5 but less than about 9, preferably more than about 2 but less than about 5.

The initial interaction of the reactants in the reaction diluent takes place in a non-gaseous state at a moderate reaction temperature. Suitable reaction temperatures are from about 30° C. to about 120° C., preferably from about 35° C. to about 90° C. This initial heating usually results in the formation of a generally clear solution. This solution then can be heated to a higher temperature to remove alkanol, ethanol in the preferred embodiment, typically as an azeotrope with a portion of the inert diluent. The temperature of this second heating will depend in part on the boiling point of any azeotrope containing alkanol that is formed. Typical heating temperatures are from about 70° C. to about 120° C., preferably from about 85° C. to about 110° C. Removing the alcohol usually results in the formation of a procatalyst precursor in the form of solid opaque, spheroidal particles. This process of making the precursor is a most preferred embodiment of the invention since it will yield a waste stream that, when heated to recover the inert diluent, may and often will precipitate a solid component.

In another preferred embodiment of the invention, the olefin polymerization procatalyst precursor is prepared by reacting a magnesium alkoxide, a titanium alkoxide and a phenolic compound at an elevated temperature in an inert diluent. The magnesium alkoxides, titanium alkoxides and phenolic compounds can be the same as the respective compounds described in the embodiments above. Specifically, the alkoxide moieties independently have up to 4 carbon atoms inclusive. The alkoxide moieties within one reactant are the same or different if more than one alkoxide moiety is present, and the alkoxide moieties of one reactant are the same or different from alkoxide moieties in other reactants. Although alkoxide moieties such as methoxide, propoxide, isopropoxide and butoxide are useful, the preferred alkoxide moieties are ethoxide. The halide moieties of the titanium tetrahalide preferably are chloride or bromide with chloride being particularly preferred. In this embodiment, in part for reasons of complex alkoxide compound purity and for ease of handling, the alkoxide moieties of both the magnesium alkoxide and the titanium alkoxide preferably are all ethoxide.

The phenolic compound, which is characterized as producing an anion group X in the formula below, preferably is selected from phenol or activating group-substituted phenol whose phenolic hydroxyl group is free from steric hindrance. The expression "activating group" as it is used in this context, denotes a ring carbon atom substituent free from active hydrogen atoms that is ortho-para directing relative to further aromatic ring substitution and which is generally but not invariably electron donating. Specifically preferred activating groups include alkyl of up to 5 carbon atoms, e.g., methyl, ethyl, isopropyl or t-butyl; alkoxy of up to 5 carbon atoms, e.g., methoxy, ethoxy, butoxy, or amyloxy; halo, particularly chloro or bromo; and dialkylamino where each alkyl has up to 5 carbon atoms such as dimethylamino and diethylamino. Particularly preferred phenolic compounds whose anions are suitable X groups in the formula below, and which are useful as an initial reactant include phenol, p-cresol, o-cresol, 3-methoxyphenol, 4-dimethylaminophenol, 2,6-dimethylphenol and 2,6-di-t-butyl-4-methylphenol. The o-cresol phenolic compound is particularly preferred, and the preferred X anion is the o-cresylate anion.

The procatalyst precursor may be produced by contacting the reactants in an inert reaction diluent. The diluent preferably is a hydrocarbon diluent such as isopentane, isooctane, cyclohexane, xylene, or toluene, or even a kerosene fraction, or the diluent is a halohydrocarbon such as methylene chloride, chlorotoluene, or chlorobenzene. Isooctane is a preferred hydrocarbon diluent and chlorobenzene is a preferred halohydrocarbon diluent. Although the formation of the procatalyst precursor does not appear to observe conventional molar stoichiometry, the complex alkoxide compounds can be illustrated by the formula (II):

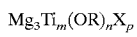

$$Mg_3Ti_m(OR)_nX_p \qquad (II)$$

wherein R independently is lower alkyl of up to 4 carbon atoms inclusive and X is a monovalent anion of the phenolic compound, 0.5≦m≦2.0, 0≦p≦2.0, and n has a value of (6+4 m−p). A preferred embodiment of the complex alkoxide compound is illustrated by the following formula (III):

$$Mg_3Ti(OR)_8X_2 \tag{III}$$

wherein R and X have the previously stated meaning.

The compounds used to make the precursor of this preferred embodiment typically are contacted at an elevated temperature and at a pressure sufficient to maintain the reaction mixture in a non-gaseous state. Suitable temperatures are from 50° C. to about 110° C. The contacting usually is conducted in a suitable reactor and contact is facilitated by conventional techniques such as shaking, stirring or refluxing. The stoichiometry of the contacting is not simple but sufficient magnesium alkoxide is provided so that the resulting solution of complex alkoxide compound has from about 1% by weight to about 6% by weight of magnesium. The formation of the complex alkoxide compound can be illustrated by the following partial equation which employs the preferred metal ethoxides:

$$x \text{ phenolic compound} + y\ Mg(OEt)_2 + z\ Ti(OEt)_4 \rightarrow$$

wherein the relative quantities of reactants are such that x is a number from 0 to about 2, y is a number from about 3 to about 4.5 and z is a number from about 0.5 to about 1.5. The complex alkoxide compound product mixture that results is a solution whose viscosity varies from "runny" to viscous depending upon the particular diluent employed and the quantity thereof as well as the ratio of starting materials employed.

The procatalyst precursor then can be crystallized by removal of alcohol to form solid opaque, spheroidal particles. These solid particles then can be separated from the mixture and dried in accordance with the procedures described above. The liquid waste stream from the precursor manufacturing unit typically will, when heated to remove the inert diluent therefrom by distillation and the like, precipitate additional solid substances that are harmful to the removal apparatus. It is particularly preferred to conduct the method of the invention on the liquid waste stream from the precursor manufacturing unit discussed immediately above.

The polymerization procatalyst precursor of the invention also can be prepared by contacting a magnesium alkoxide, a titanium alkoxide and a borate ester in an alkanol solution. The magnesium alkoxide and titanium alkoxide compounds can be the same as the respective alkoxides described above. Specifically, the alkoxide moieties independently have up to 4 carbon atoms inclusive. The alkoxide moieties within one reactant are the same or different if more than one alkoxide moiety is present, and the alkoxide moieties of one reactant are the same or different from alkoxide moieties in other reactants. Although alkoxide moieties such as methoxide, propoxide, i-propoxide, n-butoxide or i-butoxide are useful, the preferred alkoxide moieties are ethoxide. The halide moieties of the titanium tetrahalide preferably are chloride or bromide with chloride being particularly preferred. In this embodiment, in part for reasons of complex alkoxide compound purity and for ease of handling, the alkoxide moieties of both the magnesium alkoxide and the titanium alkoxide preferably are all ethoxide.

The stoichiometry of the complex alkoxide compound is of the following formula (IV):

$$Mg_3Ti_2(OR)_{14} \tag{IV}$$

wherein R independently is alkyl of up to 4 carbon atoms inclusive and is preferably ethyl.

The contacting of magnesium, titanium and boron compounds takes place in an alkanol solution at an elevated temperature and at a pressure sufficient to maintain the reaction mixture in a non-gaseous state. The alkanol preferably but not necessarily corresponds to the alkoxide moieties of one or more of the reactants. Suitable reaction temperatures are from about 20° C. to about 180° C., but preferably are from about 50° C. to about 90° C. The contacting is conducted in a suitable reactor and is facilitated by conventional techniques such as shaking, stirring or refluxing. The stoichiometry of the reaction is illustrated by the partial equation, employing preferred ethoxide moieties:

$$3Mg(OEt)_2 + 2Ti(OEt)_4 + 1.5B(OEt)_3 \rightarrow$$

The product obtained is a crystalline alcoholate upon cooling of the product mixture, and is illustrated by the following formula (V):

$$Mg_3Ti_2(OEt)_{14} \cdot n(EtOH) \tag{V}$$

wherein n is a number of from 0 to about 6.

In this embodiment, the trialkylborate is present even though boron does not appear in the crystalline product but remains in the mother liquor. The trialkylborate preferably is provided to the reaction mixture in an amount from about 0.1 mole to about 2 moles per mole of titanium, more preferably from about 0.5 mole to about 1 mole per mole of titanium. The magnesium alkoxide preferably is provided in an amount of from about 0.5 mole to about 4 moles per mole of titanium. Quantities of magnesium alkoxide from about 1 mole to about 2 moles per mole of titanium are preferred.

The resulting complex alkoxide compound alcoholate is a solid, crystalline material of low solubility in the medium of its production and is recovered from the product mixture by well known methods such as filtration or decantation. The alcoholate then is converted to the complex alkoxide compound by removal of alkanol (ethanol in the preferred embodiment). The alkanol can be removed by conventional procedures and generally involves heat. A particularly satisfactory method for alkanol removal is by an azeotropic distillation with a hydrocarbon or halohydrocarbon solvent. Any hydrocarbon or halohydrocarbon in which the complex alkoxide compound is soluble and with which the alkanol forms an azeotrope can be used for this purpose. A particularly useful hydrocarbon is isooctane and a particularly useful halohydrocarbon is chlorobenzene. The azeotropic solvent typically is added in a molar quantity in excess of the alkanol present and the resulting mixture then is heated to remove the alkanol. The complex alkoxide compound that results forms a clear solution in the excess hydrocarbon or halohydrocarbon at the boiling temperature of the azeotrope as well as upon cooling to ambient temperature.

The procatalyst precursor then can be crystallized by removal of alcohol to form solid opaque, spheroidal particles. These solid particles then can be separated from the mixture in accordance with the procedures described above. Again, the resulting waste liquid stream (or streams) from this precursor production unit, often will, when heated to remove the inert diluent by distillation and the like, precipitate solid species that are harmful to the removal apparatus.

This waste liquid from the procatalyst precursor production unit, or any liquid stream containing at least one light component and components that may precipitate from solution upon removal of the light component, then is subjected to the method of the present invention. Referring now to FIG. 1, this waste liquid is denoted by number 1. It is preferred in the present invention that this waste liquid emanate from a polymerization precursor production unit. More preferably, this waste liquid constitutes a complex mixture of an inert reaction diluent and/or wash solvent, titanium alkoxides, magnesium alkoxides, titanium halides, phenolic compounds, and alkanols. In practice, there may be more than one waste stream. For example, a first stream might contain predominately reaction diluent (with the aforementioned other species) and a second stream might contain predominately a wash solvent diluent (with residual quantities of the aforementioned other species) Each stream could be treated independently in the manner described herein or combined for treatment.

Any inert reaction diluent and/or wash solvent can be used in the process of the invention. The diluent preferably is a hydrocarbon diluent such as butane, pentane, hexane, heptane, octane, xylene, or toluene, or a halohydrocarbon such as methylene chloride, chlorotoluene, or chlorobenzene. Isooctane and isopentane are preferred hydrocarbon diluent and wash solvents and chlorobenzene is a preferred halohydrocarbon diluent wash solvent. Most preferably, the reaction diluent and wash solvent is a combination of isopentane and chlorobenzene. These reaction diluents and wash solvents are valuable components in the catalyst precursor production unit, and hence, it is desirable to recycle and reuse them. Typical unit operations available that can recycle and reuse these reaction diluents and wash solvents call for distilling or otherwise driving off the diluent or wash solvent from the mixture, and then recycling the recovered diluent or wash solvent to the precursor manufacturing unit.

The waste stream from the catalyst precursor production unit preferably contains the reaction diluent and/or wash solvent, together with some unreacted starting materials, as well as some partially reacted ingredients, some of which may precipitate upon removal of the reaction diluent. That is, should the waste stream be immediately sent to a distillation column, or other separation apparatus, and the reaction diluent and/or other light-end components driven off, solid materials will precipitate from the stream. Embodiments of the present invention are designed to effectively prevent and/or substantially reduce the formation of these precipitated materials.

The precipitated materials can form from the remaining components in the waste stream. It is believed that the waste stream from a precursor production unit contains, in addition to the above-mentioned diluent and/or wash solvent, titanium alkoxides, titanium halides, titanium halide alkoxides, magnesium alkoxides, magnesium halides, magnesium halide alkoxides, phenolic compounds, and alkanols. In addition, the waste stream may contain partially reacted components obtained by partial or incomplete reaction of the titanium alkoxides, titanium halides, titanium halide alkoxides, magnesium alkoxides, magnesium halides, magnesium halide alkoxides, phenolic compounds, and alkanols.

It is further believed that the titanium alkoxides preferably are titanium ethoxides, the titanium halides are titanium tetrachlorides, and the titanium halide alkoxides are titanium chloro ethoxides. The magnesium alkoxides preferably are magnesium ethoxides, the magnesium halide alkoxides preferably are magnesium chloro ethoxides, and the magnesium halides are trace amounts of magnesium and chlorine-containing species. Preferred alkanols and phenolic compounds are those preferred components discussed above with reference to the manufacture of the catalyst precursor.

As mentioned above, the atmospheric boiling points of the waste product components would suggest the suitability of simple distillation for separation of the waste products from the inert diluent. Simple distillation of the components, however, results in the formation of substantial amounts of undesirable solid material, particularly in the distillation column reboilers. This solid material could then have undesirable consequences by coating column reboiler sections, clogging the system or otherwise reducing the throughput and/or heat transfer in the column bottoms. Without wishing to be bound by any theory, the present inventor believes that it is likely that attempts at simple distillation will cause volatile light components, particularly alkanols (such as ethanol) to either azeotropically or otherwise overhead with the desirable reaction diluent and/or wash solvent. This in turn is believed to reduce the solubility of the remaining titanium, magnesium and/or chloride containing species in the bottoms section of the distillation zone, which in turn results in the formation of undesirable solid materials.

In an embodiment of the invention, a solubilization solvent is added to the waste stream. One of the purposes of the solubilization solvent is to enable separation of the inert diluent and/or wash solvent without causing substantial precipitation of solids. By "substantial precipitation" it is preferred that the amount of precipitates formed is reduced by at least 50% when compared to a waste stream with no added solubilization solvent. Most preferably, however, no precipitates are formed.

Any solubilization solvent can be used in the present invention so long as it at least serves the purpose stated above. Preferred solubilization solvents are those that satisfy the following criteria:

1. The solvent is "heavier" or higher boiling than the diluent that is to be recovered; and
2. The solvent offers a solubilization characteristic to titanium, magnesium and/or chloride containing species which prevents solid precipitates from forming.

Optionally, but most preferably, the solubilization solvent also satisfies a third criteria:

3. The solubilization solvent is non-azeotropic with the diluent that is to be recovered.

Distillation of the mixture that contains the waste stream from the catalyst precursor production unit plus the solubilization solvent results in separation of the hydrocarbon and/or halohydrocarbon diluent from most of the other mixture components including the separation solvent without the formation of insoluble compounds. Although the solubilization solvent may later be separated from the remaining mixture components, in preferred practice the solubilization solvent remains with the bottom mixture as it continues to waste or to further processing. The recovered reaction diluent and/or wash solvent may undergo further processing to remove any azeotropic co-solvents (for example, alkanol in hydrocarbon) via molecular sieve or other methods known to those skilled in the art.

A variety of solubilization solvents are useful in the separation process provided that the atmospheric boiling point of the separation solvent is higher than that of the diluent to be recovered. It also is preferable, but not mandatory, that the solubilization solvent be non-azeotropic with the recovered diluent. In the case of azeotrope, pure recovered product may require additional processing (for example, using molecular sieve beds) to remove the any undesired solubilization solvent in the desired diluent product. In laboratory investigation, a series of solvents have been examined for their effect on solid precipitate solubility without regard to azeotropic or boiling point concerns. The results are summarized in table 1 below.

TABLE 1

List of Solubilization Solvents[1]

| Solvent | Boiling Point (C.) | Effective at solubilizing solid precipitate? |
|---|---|---|
| Isopropyl Alcohol (2-propanol) | 82 | Yes (slow) |
| ethylene glycol dimethyl ether | 85 | Yes |
| water | 100 | Yes |
| isobutanol (2-methyl-1-propanol) | 108 | Yes |
| 1-butanol | 118 | Yes |
| 2-methoxy ethanol | 124 | Yes |
| ethylbenzene | 136 | Yes (slow) |
| 1-hexanol | 157 | Yes (slow) |
| 2-methoxyethyl ether | 162 | Yes |
| 1,1,3,3-tetramethoxy propane | 183 | Yes |
| ortho-cresol | 191 | Yes (slow) |
| 1-octanol | 196 | Yes (slow) |
| 1,5-pentanediol | 242 | Yes (slow) |
| 1,1,3-trimethoxy propane | high | Yes (slow) |
| isopentane | 30 | No |
| n-pentane | 36 | No |
| acetone | 56 | No |
| hexanes | 69 | No |
| 1-chlorobutane | 77 | No |
| heptane | 98 | No |
| 2,2,4-trimethylpentane (isooctane) | 98 | No |
| toluene | 111 | No |
| xylenes | 140 | No |
| methoxybenzene (anisole) | 154 | No |
| ethoxybenzene (phenetole) | 169 | No |
| ethylene glycol | 197 | No |
| 1,2-dimethoxy benzene (veratrole) | 206 | No |
| 1,2,4-trimethoxy benzene | 247 | No |

[1]In laboratory testing of solvents which could act as a solubilizing solvent, a waste stream sample was heated to allow the removal of volatile components and precipitation of solid material to occur. The formed solid was then placed into vials and various potential solubilizing agents were added. The effect on the solid product is noted in the table.

Preferred solvents are those meeting criteria 1 and 2 as noted above, whether listed in table 1 or not. Particularly preferred are alkanols, diols and phenolics, especially octanol.

The process of the invention, in the preferred embodiment, comprises the addition of a separation solvent of higher boiling point to a product mixture comprising isopentane and/or chlorobenzene in mixture with at least some titanium alkoxide, titanium chloroalkoxide, magnesium alkoxide and/or magnesium chloroalkoxide, a phenolic compound and a alkanol The process preferably is applied to mixtures containing a variety of alkoxide moieties, each alkoxide containing up to 4 carbon atoms inclusive. Most commonly, however, each alkoxide of the mixture to be separated is ethoxide. The resulting mixture, including the solubilization solvent preferably is passed to a distillation zone which produces a split wherein the reaction diluent (e.g., chlorobenzene or isopentane) along with light alkanols (such as ethanol) are the distillate product and a bottoms product includes the remainder of the mixture, including the solubilization solvent. The distillate may undergo further processing to remove light alkanols such as by adsorption via molecular sieve bed.

A variety of solubilization solvents are useful in the separation process provided that the atmospheric boiling point of the solubilization solvent is higher than that of diluent, and that it provides sufficient solubility to the components of the mixture undergoing separation to maintain those components or reaction products thereof in solution. Such solvents could include any of the solvents listed in Table 1 above that solubilize the precipitate, and that have a higher boiling point than the diluent to be recovered. Skilled artisans are capable of preparing a similar table depending upon the diluent or solvent to be recovered, as well as the potential precipitated solids. Preferred solvents for use in various embodiments of the invention include alcohols, diols and phenolic compounds such as octanol, decanol and cresol. Particularly preferred is octanol.

Any amount of solubilization solvent can be supplied to the waste product mixture as long as it satisfies the first two of the above-mentioned criteria (satisfying the azeotropic criteria is optional). Preferably, enough solvent should be supplied to provide equivalent solid solubility to that of the light alcohol species (especially ethanol) in solution. There is no defined maximum amount, but for practical purposes, the quantity should be kept close to the equivalent solubility level. This will limit the total amount of solubilizing solvent added which will eventually contribute to the total waste quantity, or to the total amount of solvent which would be later processed.

Turning now to FIG. 1, the figure depicts a mixing zone (10) which may be a tank or may be direct mixing in a line or pipe of a polyolefin procatalyst precursor process waste stream (1) and the solubilizing solvent (2). Once combined, the combined stream containing at least the waste stream and the solubilizing agent enters the distillation zone (20) which is shown as a single column, but could alternatively be multiple columns. A suitable column is a packed column of from 2 to 4 sections, each of which has multiple stages. Other types of multiple stage columns also are suitable. Those skilled in the art are capable of determining a suitable column to effect the desired separation depending, inter alia, upon the composition of the waste stream, the potential precipitate, and the solubilization solvent, using the guidelines provided herein.

Typical operation of the distillation zone depends on the diluent to be recovered. For halohydrocarbon recovery, such as chlorobenzene, the column may operate at ~11 psig (base) and a temperature varying from ~120° C. at the top to ~170° C. at the bottom of the column. In this case, materials which are lighter than the recovered solvent (5) could be distilled as a column overhead stream (4), or multiple columns could be used to remove light-end impurities. The concentrated waste stream, including the solubilization solvent added as stream 2 would exit the system in stream (6). Column pressure could be adjusted upward or downward, with a concurrent increase or decrease in the described temperature profile. Downsteam processes for azeotropic or other impurity removal (such as molecular sieves) could be included for the exiting product stream (5). Exiting product stream (5) then may be recycled to the polymerization catalyst precursor production unit for reuse, or it may be stored and used for other purposes, or sold.

For hydrocarbon recovery, such as isopentane, the column may operate at ~35 psig (base) and a temperature varying from ~67° C. at the top to 172° C. at the bottom of the column. In this case, materials that are lighter than the recovered solvent (5) could be distilled as a column overhead stream (4), multiple columns could be used to remove light-end impurities, or if impurities lighter than the recovered hydrocarbon are minimal, these impurities could remain as part of the recovered product steam. The concentrated waste stream, including the solubilization solvent added as stream 2 would exit the system in stream (6).

Column pressure could be adjusted upward or downward, which a concurrent increase or decrease in the noted temperature profile. Downsteam processes for azeotropic or other impurity removal (such as molecular sieves) could be included in the exiting product. Again, those skilled in the art are capable of operating the separation column or unit depending upon the diluent to be recovered, solubilization solvent, etc., using the guidelines provided herein.

Entering the system via line (1) preferably is a waste product stream from an olefin polymerization procatalyst precursor production facility (not shown), which may contain a reaction diluent and/or wash solvent, tetravalent titanium chlorethoxy compounds, magnesium alkoxide and/or magnesium chloroalkoxides, phenolic compounds, and alkanols. A solubilization solvent such as octanol can be added via line (2). It will be appreciated that FIG. 1, and the accompanying discussion depict a simplified processing scheme, and in actual operation the process will employ pumps, reboilers, rectifiers and/or other mechanical features as will be apparent to one skilled in this art.

It also will be appreciated that side draw (5) may not be needed in all cases. For example, if isopentane is the diluent that is desired to be recovered, this diluent can be removed from the column via the lights line (4), which then can be subsequently treated to recover the isopentane. If monochlorobenzene is the diluent that is to be recovered, however, it is preferred that side draw (5) be included. Skilled artisans are capable of determining whether or not side draw (5) is required, using the guidelines provided herein.

The overall separation process of various embodiments of the present invention provides an efficient method of separating a reaction diluent and/or a wash solvent from the other components of a waste product stream resulting from production of an olefin polymerization procatalyst precursor. The process provides for such separation by a separation scheme without the precipitation of the solid complexes normally obtained during the separation of such reaction diluent and/or wash solvent. The above-described embodiments of the invention therefore provide for more economical operation of the production of certain types of olefin procatalyst precursors, as well as the process of producing olefin polymerization catalyst precursor and the polymerization process which employs that catalyst.

The precursor made in accordance with any of the above methods then can be immediately converted to a procatalyst by any suitable means described below, or it can be stored for later use or for shipment to a facility capable of converting the precursor to a procatalyst. Upon drying, the solid precursor material can be discharged by any suitable means to downstream processing. Solids processing may include conveying to suitable storage and/or transportation containers or to another vessel for additional material processing.

Conversion of the dried procatalyst precursor to a polymerization procatalyst can be accomplished in any suitable manner. For example, the precursors of the invention can be converted to polymerization procatalyst by reaction with a tetravalent titanium halide, an optional hydrocarbon or halohydrocarbon and an electron donor. The tetravalent titanium halide is suitably an aryloxy- or alkoxy di- or trihalide such as diethoxytitanium dichloride, dihexyloxytitanium dibromide or diisopropoxytitaniumchloride or the tetravalent titanium halide is a titanium tetrahalide such as titanium tetrachloride or titanium tetrabromide. A titanium tetrahalide is preferred as the tetravalent titanium halide and particularly preferred is titanium tetrachloride.

The optional hydrocarbon or halohydrocarbon employed in the production of olefin polymerization procatalyst can be a halohydrocarbon of up to 12 carbon atoms inclusive, preferably up to 9 carbon atoms inclusive, which contains at least one halogen atom and in the case of aliphatic halohydrocarbons contains at least two halogen atoms. Exemplary hydrocarbons include acetone, pentane, octane, benzene, toluene, xylene, alkylbenzenes, and the like. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Aromatic halohydrocarbons suitably employed in the present invention include chlorobenzene, bromobenzene, dichlorobenzene and chlorotoluene. Of the aliphatic halohydrocarbons, carbon tetrachloride and 1,1,2-trichloroethane are preferred. The aromatic halohydrocarbon chlorobenzene is particularly preferred.

Any electron donor can be used in the present invention so long as it is capable of converting the precursor into a procatalyst. Suitable electron donors are those electron donors free from active hydrogens that are conventionally employed in the formation of titanium-based procatalysts. Particularly preferred electron donors include ethers, esters, amines, imines, nitriles, phosphines, stibines, alkoxybenzenes, and arsines. The more preferred electron donors, however, include esters, particularly alkyl esters of aromatic monocarboxylic or dicarboxylic acids. Examples of such electron donors are methyl benzoate, ethyl benzoate, ethyl p-ethoxybenzoate, ethyl p-methylbenzoate, diethyl phthalate, dimethyl naphthalene dicarboxylate, diisobutyl phthalate and diisopropyl terephthalate. The electron donor is a single compound or is a mixture of compounds but preferably the electron donor is a single compound. Of the preferred ester electron donors, ethyl benzoate, dialkoxybenzenes, ethoxy, n-alkoxybenzenes, and diisobutyl phthalate are particularly preferred.

The manner in which the procatalyst precursor, the optional hydrocarbon or halohydrocarbon and the electron donor are contacted is not critical. In one embodiment, the tetravalent titanium halide is added to a mixture of the electron donor and solid procatalyst precursor. More preferably, however, the electron donor first is mixed with the tetravalent titanium halide and optional halohydrocarbon and the resulting mixture is used to contact the solid procatalyst precursor. Other procedures also are suitable, but less preferred. The solid product that results typically is washed at least once with tetravalent titanium halide and the optional halohydrocarbon, taken together or employed separately. It often is useful to include an acid chloride, e.g., benzoyl chloride or phthaloyl chloride in at least one wash to further facilitate the replacement of at least a portion of the alkoxide moieties. This replacement, often termed a halogenation, is known in the art and skilled artisans are capable of carrying out such halogenation using the guidelines provided herein. The solid olefin polymerization procatalyst that results from this procedure then is usually washed with a light hydrocarbon such as isooctane to remove soluble titanium compounds.

In a preferred embodiment, the mixture of procatalyst precursor, tetravalent titanium halide, electron donor and halohydrocarbon is maintained at an elevated temperature, for example, a temperature of up to about 150° C. Best results are obtained if the materials are contacted initially at or about ambient temperature and then heated. Sufficient tetravalent titanium halide is provided to convert at least a portion and preferably at least a substantial portion of the alkoxide moieties of the procatalyst precursor to halide groups. This replacement is conducted in one or more contacting operations, each of which is conducted over a period of time ranging from a few minutes to a few hours and it is preferred to have halohydrocarbon present during each contacting. Sufficient electron donor usually is provided so that the molar ratio of electron donor to the magnesium present in the solid procatalyst is from about 0.01:1 to about 1:1, preferably from about 0.05:1 to about 0.5:1. The final washing with light hydrocarbon produces a procatalyst that is solid and granular and when dried is storage stable provided that oxygen and active hydrogen compounds are excluded. Alternatively, the procatalyst is used as obtained from the hydrocarbon washing without the need of drying. The procatalyst thus produced is employed in the production of an olefin polymerization catalyst by contacting the procatalyst with a cocatalyst and a selectivity control agent.

The final washed and dried procatalyst product suitably has a titanium content of from about 0.5 percent by weight to about 6.0 percent by weight, preferably from about 1.5 percent by weight to about 4.0 percent by weight. The atomic ratio of titanium to magnesium in the final procatalyst product is suitably between about 0.01:1 and about 0.2:1, preferably between about 0.02:1 and about 0.1:1. The internal electron donor is present in the procatalyst in a ratio of internal electron donor to magnesium of from about 0.005:1 to about 10.0:1, preferably from about 0.02:1 to about 2.0:1.

The magnesium and titanium-containing procatalyst serves as one component of a Ziegler-Natta catalyst system where it is contacted with a cocatalyst and a selectivity control agent. The cocatalyst component employed in the Ziegler-Natta catalyst system may be chosen from any of the known activators of olefin polymerization catalyst systems employing a titanium halide, but organoaluminum compounds are preferred. Illustrative organoaluminum cocatalysts include trialkylaluminum compounds, alkyaluminum alkoxide compounds and alkylaluminum halide compounds in which each alkyl independently has from 2 to 6 carbon atoms inclusive. The preferred organoaluminum cocatalysts are halide free and particularly preferred are the trialkylaluminum compounds such as those wherein each of the alkyl groups contain from 1 to 6 carbon atoms.

Suitable organoaluminum cocatalysts include compounds having the formula $Al(R''')_d X_e H_f$ wherein: X is F, Cl, Br, I or OR'''', R''' and R'''' are saturated hydrocarbon radicals containing from 1 to 14 carbon atoms, which radicals may be the same or different, and, if desired, substituted with any substituent which is inert under the reaction conditions employed during polymerization, d is 1 to 3, e is 0 to 2, f is 0 or 1, and d+e+f=3. Such cocatalysts can be employed individually or in combination thereof and include compounds such as $Al(C_2H_5)_3$, $Al(C_2H_5)_2Cl$, $Al_2(C_2H_5)_3Cl_3$, $Al(C_2H_5)_2H$, $Al(C_2H_5)_2(OC_2H_5)$, $Al(i-C_4H_9)_3$, $Al(i-C_4H_9)_2H$, $Al(C_6H_{13})_3$ and $Al(C_8H_{17})_3$.

Preferred organoaluminum cocatalysts are triethyl aluminum, triisopropyl aluminum, triisobutyl aluminum and diethylhexyl aluminum. Triethyl aluminum is a preferred trialkyl aluminum cocatalyst. The organoaluminum cocatalyst, during formation of the olefin polymerization catalyst, is preferably employed in a molar ratio of aluminum to titanium of the procatalyst of from about 1:1 to about 150:1, but more preferably in a molar ratio of from about 10:1 to about 100:1.

The final component of the Ziegler-Natta catalyst system is the selectivity control agent (SCA), or external electron donor. Typical SCAs are those conventionally employed in conjunction with titanium-based procatalysts and organoaluminum cocatalysts. Illustrative of suitable selectivity control agents are those classes of electron donors employed in procatalyst production as described above as well as organosilane compounds including alkylaklyoxysilanes and arylalkoxysilanes. Particularly suitable silicon compounds of the invention contain at least one silicon-oxygen-carbon linkage. Suitable silicon compounds include those having the formula $R^1_m SiY_n X_p$ wherein: $R^1$ is a hydrocarbon radical containing from 4 to 20 carbon atoms, Y is —$OR^2$ or —$OCOR^2$ wherein $R^2$ is a hydrocarbon radical containing from 1 to 20 carbon atoms, X is hydrogen or halogen, m is an integer having a value of from 0 to 3, n is an integer having a value of from 1 to 4, p is an integer having a value of from 0 to 1, and preferably 0, and m+n+p=4. $R^1$ should be such that there is at least one non-primary carbon in the alkyl and preferably, that such non-primary carbon is attached directly to the silicon atom. Examples of $R^1$ include cyclopentyl, t-butyl, isopropyl or cyclohexyl. Examples of $R^2$ include ethyl, butyl, isopropyl, phenyl, benzyl and t-butyl. Examples of X are Cl and H.

Each $R^1$ and $R^2$ may be the same or different, and, if desired, substituted with any substituent which is inert under the reaction conditions employed during polymerization. Preferably, $R^2$ contains from 1 to 10 carbon atoms when it is aliphatic and may be sterically hindered or cycloaliphatic, and from 6 to 10 carbon atoms when it is aromatic. Silicon compounds in which two or more silicon atoms are linked to each other by an oxygen atom, i.e., siloxanes or polysiloxanes, may also be employed, provided the requisite silicon-oxygen-carbon linkage is also present. The preferred selectivity control agents are alkylalkoxysilanes such as ethyl diethoxysilane, diisobutyl dimethoxysilane, cyclohexyl methyl dimethoxysilane, propyl trimethoxysilane and dicyclopentyl dimethoxysilane. In one modification, the selectivity control agent is a portion of the electron donor added during procatalyst production. In an alternate embodiment, the selectivity control agent may be provided at the time of the contacting of procatalyst and cocatalyst. In either modification, the selectivity control agent preferably is provided in a quantity of from 0.1 mole to about 100 moles per mole of titanium in the procatalyst. Preferred quantities of selectivity control agent are from about 0.5 mole to about 25 mole per mole of titanium in the procatalyst.

The olefin polymerization catalyst can be produced by any known procedure of contacting the procatalyst, the cocatalyst and the selectivity control agent. The method of contacting is not critical. In addition, the catalyst components can be precontacted prior to polymerization to form a preactivated catalyst, or the components can be contacted with an olefin monomer to form a prepolymerized catalyst. In one embodiment, the catalyst components simply are mixed in a suitable reactor and the preformed catalyst thereby produced is introduced into the polymerization reactor when initiation of polymerization is desired. In an alternate modification, the catalyst components are introduced into the polymerization reactor where the catalyst is formed in situ.

The olefin polymerization catalyst may be used in slurry, liquid phase, gas phase and liquid monomer-type reaction systems as are known in the art for polymerizing olefins. Polymerization preferably is conducted in a fluidized bed polymerization reactor, however, by continuously contacting an alpha-olefin having 3 to 8 carbon atoms with the three components of the catalyst system, i.e., the solid procatalyst component, cocatalyst and SCAs. In accordance with the process, discrete portions of the catalyst components are continually fed to the reactor in catalytically effective amounts together with the alpha-olefin while the polymer product is continually removed during the continuous process. Fluidized bed reactors suitable for continuously polymerizing alpha-olefins have been previously described and are well known in the art. Fluidized bed reactors useful for this purpose are described, e.g., in U.S. Pat. Nos. 4,302,565, 4,302,566 and 4,303,771, the disclosures of which are incorporated herein by reference. Those skilled in the art are capable of carrying out a fluidized bed polymerization reaction using the guidelines provided herein.

It is preferred sometimes that such fluidized beds are operated using a recycle stream of unreacted monomer from the fluidized bed reactor. In this context, it is preferred to condense at least a portion of the recycle stream. Alternatively, condensation may be induced with a liquid solvent. This is known in the art as operating in "condensing mode." Operating a fluidized bed reactor in condensing mode generally is known in the art and described in, for example, U.S. Pat. Nos. 4,543,399 and 4,588,790, the disclosures of which are incorporated by reference herein in their entirety. The use of condensing mode has been found to lower the amount of xylene solubles in isotactic polypropylene and improve catalyst performance when using the catalyst of the present invention.

The precise procedures and conditions of the polymerization are broadly conventional but the olefin polymerization process, by virtue of the use therein of the polymerization catalyst formed from the solid precursor, provides polyolefin product and particularly polypropylene product having a relatively high bulk density in quantities that reflect the relatively high productivity of the olefin polymerization catalyst. The polymerization product of the present invention can be any product, homopolymer, copolymer, terpolymer, and the like. Usually, the polymerization product is a homopolymer such as polyethylene or polypropylene, particularly polypropylene. Alternatively, the catalyst and process of the invention are useful in the production of copolymers including copolymers of ethylene and propylene such as EPR and polypropylene impact copolymers when two or more olefin monomers are supplied to the polymerization process. Those skilled in the art are capable of carrying out suitable polymerization of homopolymers, copolymers, terpolymers, etc., using liquid, slurry or gas phase reaction conditions, using the guidelines provided herein.

While the invention has been described with reference to particularly preferred embodiments, and by reference to the attached Figure, those skilled in the art will appreciate that various modifications may be made to the invention without departing from the spirit and scope thereof All documents referred to in this description are incorporated by reference herein in their entirety.

What is claimed is:

1. A method of removing at least one inert reaction diluent or wash diluent from a waste stream from a catalyst precursor production unit, whereby the waste stream includes at least one reaction diluent or wash diluent selected from a group consisting of butane, pentane, hexane, heptane, octane, xylene, toluene, methylene chloride, chlorotoluene, and chlorobenzene, titanium alkoxide, magnesium alkoxide, and ethanol, the method comprising:

contacting the waste stream with a solubilization solvent selected from the group consisting of octanol and decanol; and subjecting the resulting stream to distillation such that precipitation of solids during distillation is prevented or reduced, wherein the solubilization solvent: (i) is present in an amount sufficient to maintain the solubility of residual titanium and magnesium alkoxide species; (ii) has a boiling point higher than any reaction diluent or wash diluent; and (iii) does not form an azeotrope with the reaction diluent or wash diluent.

2. The method according to claim 1, wherein the pentane is isopentane and the octane is isooctane.

3. The method according to claim 1 wherein the solubilization solvent is octanol.

* * * * *